US012783716B1

(12) United States Patent
Horta et al.

(10) Patent No.: US 12,783,716 B1
(45) Date of Patent: Nov. 3, 2026

(54) ISOLATED MODEL DEPLOYMENTS USING SHARED BASE COMPONENTS

(71) Applicant: Amazon Technologies, Inc., Reno, NV (US)

(72) Inventors: Mark Horta, Nutley, NJ (US); Aidan Crank, Delaware Water Gap, PA (US); Dillon Ponzo, Little Silver, NJ (US); Isaac Kleinman, Brooklyn, NY (US); Xiaotong Li, Long Island City, NY (US); Eun Kyung Kwon, New York, NY (US)

(73) Assignee: Amazon Technologies, Inc., Reno, NV (US)

( * ) Notice: Subject to any disclaimer, the term of this patent is extended or adjusted under 35 U.S.C. 154(b) by 899 days.

(21) Appl. No.: 18/082,664

(22) Filed: Dec. 16, 2022

(51) Int. Cl.
*G06F 21/62* (2013.01)
*G06F 9/50* (2006.01)
*G06F 21/60* (2013.01)
*G06N 5/04* (2023.01)

(52) U.S. Cl.
CPC ........ *G06F 21/6245* (2013.01); *G06F 9/5055* (2013.01); *G06F 21/602* (2013.01); *G06N 5/04* (2013.01)

(58) Field of Classification Search
CPC .. G06F 21/6245; G06F 9/5055; G06F 21/602; G06N 5/04
USPC .......................................................... 717/170
See application file for complete search history.

(56) References Cited

U.S. PATENT DOCUMENTS 11,341,339 B1 * 5/2022 Li ............................ G06F 40/40
11,467,872 B1 * 10/2022 Mauer .................... G06F 9/5044
11,500,830 B2 * 11/2022 Quader ................. G06F 16/213
11,789,781 B1 * 10/2023 Murthy ............... G06F 11/3414
702/186
12,327,141 B1 * 6/2025 Azhikodan ........... G06F 9/5038
(Continued)

OTHER PUBLICATIONS

Krebs, Rouven, et al. "Resource usage control in multi-tenant applications." 2014 14th IEEE/ACM International Symposium on Cluster, Cloud and Grid Computing. IEEE, 2014.pp. 122-131. (Year: 2014).*

(Continued)

*Primary Examiner* — Satish Rampuria
(74) *Attorney, Agent, or Firm* — Hogan Lovells Cadwalader US LLP

(57) ABSTRACT

Approaches presented herein relate to the performing of tasks involving sensitive user data in a multi-tenant resource environment. In particular, various approaches provide for the allocation of resources to perform tasks, such as inferencing tasks, using user-specific data and models deployed in isolated, single tenant environments. A set of base models, code, and artifacts can be maintained and updated as appropriate. When a user requests to perform an inferencing task, these base components can be deployed to a user-specific environment for performing the inferencing task. After the inferencing task has been performed, the model and associated components can be removed from the user-specific environment. In instances where a user might want to further train or fine-tune a model using user-specific data, offline training may be performed to generate a new, user-specific artifact or set of weights, which can subsequently be applied to the base components to effectively obtain a user-specific model.

20 Claims, 9 Drawing Sheets

(56) References Cited

U.S. PATENT DOCUMENTS

| | | | | |
|---|---|---|---|---|
| 2014/0196130 | A1* | 7/2014 | Brooker | G06F 21/44 726/6 |
| 2017/0318083 | A1* | 11/2017 | Ignatyev | H04L 43/0876 |
| 2018/0089163 | A1 | 3/2018 | Ami et al. | |
| 2020/0185098 | A1 | 6/2020 | Stevens et al. | |
| 2022/0237505 | A1 | 7/2022 | Feldman et al. | |
| 2022/0383149 | A1* | 12/2022 | Cao | G06N 5/04 |
| 2024/0020572 | A1 | 1/2024 | Bhandaru et al. | |
| 2024/0383133 | A1 | 11/2024 | Bydlon et al. | |

OTHER PUBLICATIONS

Ru, Jia, et al. "Providing fairer resource allocation for multi-tenant cloud-based systems." 2015 IEEE 7th International Conference on Cloud Computing Technology and Science (CloudCom). IEEE, 2015. pp. 306-313. (Year: 2015).*

Das, Sudipto, et al. "CPU sharing techniques for performance isolation in multi-tenant relational database-as-a-service." Proceedings of the VLDB Endowment 7.1 (2013): pp. 37-48. (Year: 2013).*

Ramegowda, Ashalatha, Jayashree Agarkhed, and Siddarama R. Patil. "Adaptive task scheduling method in multi-tenant cloud computing." International Journal of Information Technology 12.4 (2020): pp. 1093-1102. (Year: 2020).*

Krebs, Rouven, et al. "Resource usage control in multi-tenant applications." 2014 14th IEEE/ACM International Symposium on Cluster, Cloud and Grid Computing. IEEE, 2014. pp. 1-10. (Year: 2014).*

Lang, Willis, et al. "Towards multi-tenant performance SLOs." IEEE Transactions on Knowledge and Data Engineering 26.6 (2013): pp. 1447-1463. (Year: 2013).*

Liu et al., "A Novel Model Combining Transformer and Bi-LSTM for News Categorization", Dec. 1, 2022, IEEE, 9 pages.

Grossman Liu et al., "A deep database of medical abbreviations and acronyms for natural language processing", Jun. 2, 2021, Scientific Data, 9 pages.

Ben Veyseh et al., "What Does This Acronym Mean? Introducing a New Dataset for Acronym Identification and Disambiguation", Oct. 28, 2020, arXiv, 17 pages.

Non-Final Office Action issued in U.S. Appl. No. 18/083,092, dated Oct. 28, 2025 p. 1-45.

Ueffing et al., "Word-Level Confidence Estimation for Machine Translation", Computational Linguistics, vol. 33, No. 1, 2007, pp. 9-40.

Skreta et al., "Automatically disambiguating medical acronyms with ontology-aware deep learning", Nature Communications, 2021, https://doi.org/10.1038/s41467-021-25578-4 | www.nature.com/naturecommunications, pp. 1-10.

Final Office Action issued in U.S. Appl. No. 18/083,092 dated Apr. 10, 2026.

Non-Final Office Action issued in U.S. Appl. No. 18/980,917 dated Feb. 9, 2026.

Benton, "Machine Learning Systems and Intelligent Applications", IEEE, vol. 37, No. 4, 2020, pp. 43-49.

* cited by examiner

ISOLATED MODEL DEPLOYMENTS USING SHARED BASE COMPONENTS

BACKGROUND

Security is of significant importance in many network-connected environments where there may be many different users or resources, but access to certain data or resources is limited to only a subset of those users or resources. For multi-tenant environments where sensitive or confidential user data is to be stored with secured access, this can include providing isolation between resources allocated to different users such that there is little to no risk of customer data leaks or unauthorized access. For users who utilize machine learning or artificial intelligence, this can also involve isolating the relevant models or neural networks, as it is possible to extract at least some amount of user data from these models or networks if they were trained using that user data. Since components such as machine learning models and neural networks can be quite large, creating and maintaining a separate model for a large number of users can quickly become very expensive and inefficient. Further, making certain types of changes may require retraining each model individually, which can also be very time and resource intensive.

BRIEF DESCRIPTION OF THE DRAWINGS

Various embodiments in accordance with the present disclosure will be described with reference to the drawings, in which.

DETAILED DESCRIPTION

Figure 1:
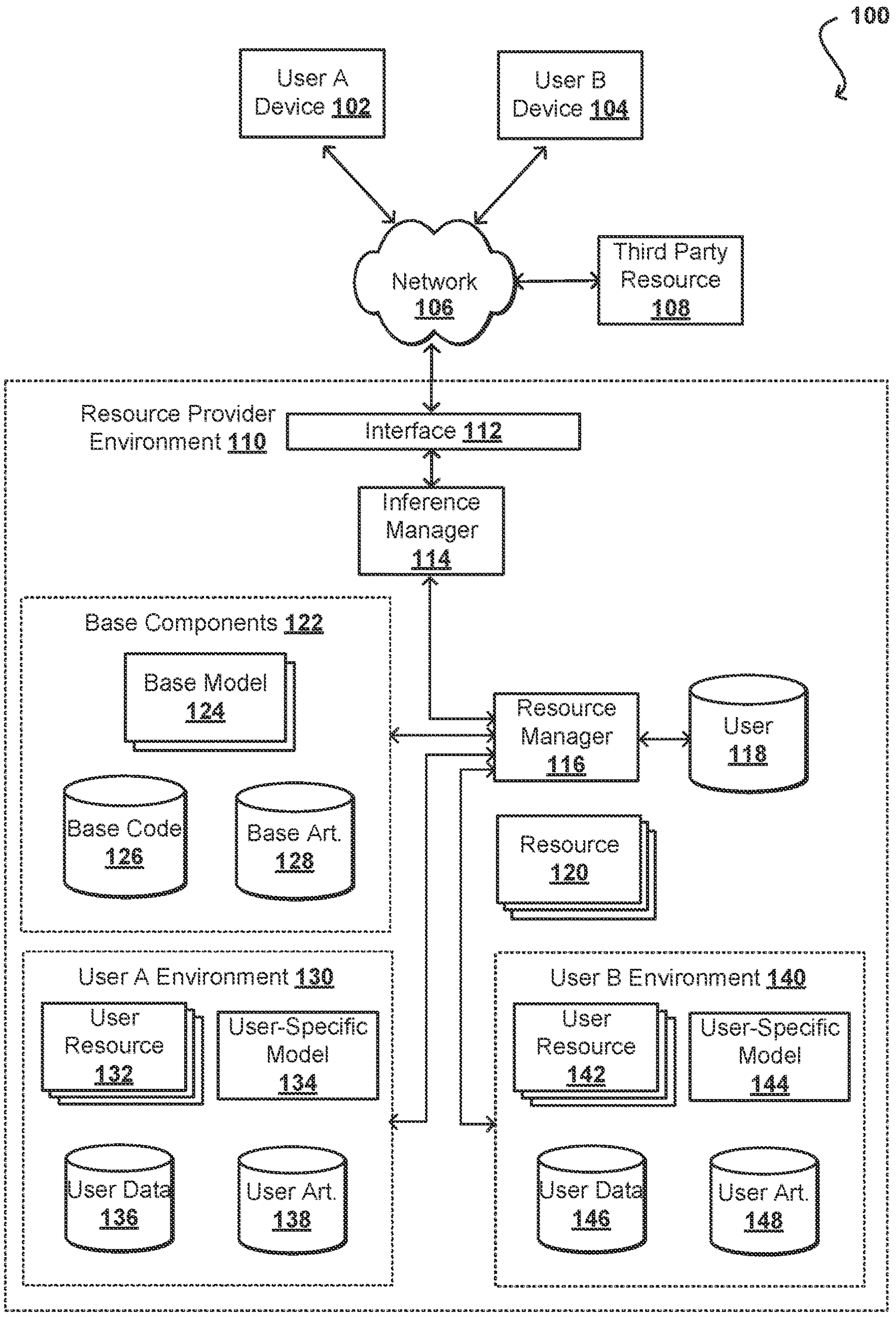
FIG. 1 illustrates an example system that can manage multiple, isolated instances of a user model that can be used in accordance with various embodiments.

Approaches described and suggested herein relate to the allocation, maintenance, and security of resources that may be used to perform various tasks in a multi-tenant resource environment. In particular, various approaches provide for the allocation of resources to perform tasks, such as inferencing tasks, using user-specific data and models deployed in isolated, single tenant environments. In at least one embodiment, a set of base models, code, and artifacts can be maintained and updated as appropriate. When a user requests or instructs to perform an inferencing task, for example, these base components can be deployed to a user-specific environment, that is at least partially within the multi-tenant environment, for performing the inferencing task. In this way, the user data will not be accessible outside the isolated environment (or a related user environment), and a separate copy of the model, code, and artifact(s) will not need to be maintained for each user in the multi-tenant environment. After the inferencing task has been performed, the model and associated components can be removed from the user-specific environment such that these components may be stored and available for individual users only (or primarily) as needed. In some instances, a user might want to further train or fine-tune a model using user-specific data (e.g., sensitive data provided by, or relating to, a given user). This training may be performed offline in some embodiments, which can generate a new, user-specific artifact or set of weights. A pointer to this user-specific artifact can be stored in a secure location, such the user-specific artifact can be loaded with the base model and base code when a subsequent inferencing task of that type is to be performed. The application of the user-specific weights enables this model to function as a user-specific model, but aspects such as the execution code and model architecture can remain unchanged and can still be shared across users. In some instances, roles may be created that can be assumed by various services to obtain access to user data encrypted under a user key, where the roles can be associated with one or more grants that provide for access at least within certain execution contexts. In some instances, a single role can be used under a user-specific context to access data in a specific environment under a corresponding set of credentials, allowing for one role to be used across many users. By reusing base components across users, the amount of storage space needed is greatly reduced, and updates or changes can be applied to these based components without a need to update the components for each of the relevant users.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example system 100 that can be used to manage resources in a resource provider environment 110. These resources may include any appropriate electronic or computing resources, as may include servers, databases, network routers, balancers, and other such resources. At least some of these resources may be allocated, or at least partially allocated, to one or more users as part of a shared-resource or multi-tenant resource offering. For example, a first User A might have a first set of resources (e.g., physical or virtual machines, machine instances, or portions thereof) allocated in an environment 130 (or logical portion of the resource provider environment) for use by User A, with that environment 130 being isolated or secured such that only User A, or a person or resource with permission granted by User A and providing the appropriate credentials, can access the user resources 132 allocated to the User A environment 132, as well as user data 136 stored in that environment 130. Similarly, a second User B might have a second set of resources allocated in another environment 140 within the resource provider environment 110 for use by User B, with that environment being isolated or secured such that only User B, or someone with permission granted by User B, can access the user resources 142 or user data 146 in that User B environment 140. In operation, a user associated with User A can use a user device 102 to submit a request for access, with appropriate credentials, across at least one wired or wireless network 106, such as the Internet, an ethernet, a cellular network, a peer network, or a local area network, to be received by an interface layer 112 of the resource provider environment and directed to the resources in the appropriate User A environment 130. A user associated with User B can use another device 104 (or the same device in some instances where permitted) to submit a similar request or call to obtain access to data or resources in the User B environment 140. In at least one embodiment, isolation can be further provided by ensuring that some, if not all, calls for a user environment or execution context do not pass outside a trusted environment, such as where services calling into an isolated environment do not pass outside the resource provider environment 110, such as might otherwise involve transmission over an external network such as the Internet or a cellular network. In at least one embodiment, enforcement can occur at various access points to ensure that communications are only transmitted internally within a trusted or secure environment. In some embodiments, communications may be limited to coming from specific sources and using specific endpoints, even within a secure environment.

One or more isolation mechanisms can be implemented in the resource provider environment to ensure that resources and/or data for User A in the user A environment 130 are not accessible to User B, and vice versa. Isolation mechanisms can also be implemented to ensure that resources 142 in the User B environment 140, or a third party resource 108, are not able to access resources or data in the User A environment, unless permitted and presenting the appropriate credentials, etc. Isolation mechanisms can include mechanisms such as access control policies, credential management and enforcement, access point management, data encryption and key management, role creation and management, and the like, which can provide for a logical separation between users and user environments. Using these and other such mechanisms, isolated user-specific environments 130, 140 can be provided using resources 120 of a resource provider environment, where those environments can function and provide security and protection as if those user environments were standalone environments. The resources allocated to a given environment can be managed by a system or service such as a resource manager 116, to ensure aspects such as health, compatibility, and sufficient capacity. The resource manager 116 can also access information associated with a user account from a user database 118, for example, to determine aspects such as types of resources able to be allocated, amount or type of usage, isolation or security policies to be applied, and the like.

In this example, both User A and User B are able to perform some amount of inferencing using respective user-specific models 134, 144. In at least one embodiment, these can be models that are derived from the same base model or different base models, and then trained or fine-tuned using data specific to a given user. In some embodiments, models may be used that are not trained or fine-tuned for a given user model, and may be instances of the base model that are only able to be accessed by a given user (or others associated with that user) in a given user environment. It should be understood that while "user" is the primary term used herein for a person or entity that can obtain access to allocated resources in a resource provider environment, such as by having an account with the resource provider, a user can refer generally to any person, entity, organization, group, system, application, service, or other such object, source, or identity for which data and resources can be allocated and/or stored, and for which access can be granted. For example, a "user" in this context might be an enterprise that has many authorized users, persons, or systems able to access resources in a respective user environment using permission associated with a user account.

As mentioned, however, it may be undesirable (or at least inefficient) to have to maintain separate models for each user environment, or other unique or isolated user allocation. For example, these networks or models can be very large, as may require the storage of billions of network weights or more, and it can be inefficient to store many copies of these models and weights, particularly when at least some of these models or weights might be identical. Further, having a large number of separate models typically means that each of these models would need to be retrained for any updates or additional training data, and model training can be a slow and expensive process. In addition to the system cost, this may also result in updates or further training being applied less frequently, which can reduce overall system accuracy. As mentioned, however, sharing access can present issues when it comes to isolation and security, as these networks and models can potentially be used to extract information about the data that was used to train or fine-tune them, which in many instances would include user data for user-specific models.

Accordingly, approaches in accordance with various embodiments can provide a model runtime deployment system or service that can allow for the user of shared base images and artifacts while still providing for isolation of the resulting models and data. In at least one embodiment, this can involve an inference manager 114, or other such system or service, that has access to a set of base component 122 within, or accessible to, the resource provider environment 110. These base components can include one or more base models 124 that can be used to perform one or more inferencing tasks. These models can be pre-trained to perform these inferencing tasks, such as by using publicly-available data or data that is otherwise not prevented from being shared by at least some users of the resource provider environment. The models can include models of various types and architectures (e.g., convolutional neural networks, U-Nets, and so forth), including one or more instances of the models that may be trained for specific types of inferencing tasks. These models might be trained to generally perform an inferencing task, but may benefit from fine-tuning on specific data in order to produce higher quality inferences on a specific dataset, such as a user dataset. These base models 124 may also include base artifacts 126 that can be used with the models, as well as base code 126 that can be used to run the models. In this way, a user environment can obtain a copy of the base model 124, base artifact 128, and base code 126 from the base components 122 any time a copy of the model is needed to be used within an isolated environment, without having to store and maintain a separate copy for that specific user. Having these base components all in a single location also has the benefit of any updates or modifications only needing to be applied to these base components. For example, if additional training data is obtained that is to be used to further train a base model 124 then fine-tuning of only this base model 124 needs to be performed, rather than multiple copies or instances in user-specific environments. Once fine-tuning is performed, the base artifact 128 and base code can 126 be updated as appropriate. When a user subsequently needs a copy of a model for inferencing, the user can automatically receive the updated model, code, and/or artifact, and can run more accurate inferencing without ever having to do anything in the user environment. Once the user is done with the model, the model, artifact, and code can be deleted from that user environment. The model, code, and artifact can be deployed using various mechanisms, such as a software container (e.g., a Docker container) that includes all software and configuration for performing inferencing, which can include a copy of all relevant and current base components 122, along with any other software, code, or configuration needed to perform the target inferencing in the respective user environment.

There may be situations, however, where a user will want to use a version of the model that is further trained, or fine-tuned, using additional or specific data, which may not be publicly accessible or permitted for distribution outside a user environment. In some instances, this may involve first allocating a copy of a relevant base model 124 that has been pre-trained, then further training this model instance using this additional data. In situations such as this, where it can be undesirable to perform repeated training using the same data, the user-specific model can be stored for subsequent use in the user environment. In other instances, where the fine-tuning may not be as significant, a copy of the relevant base model 124 may be loaded each time, but a pointer for the model can point to an artifact in the relevant environment that is specific to that user. In this way, a most recent version of the model can be finetuned in the environment for a specific type of inferencing, and when this inferencing is completed then the copy of the model can be deleted such that no further storage or maintenance is required, at least until the model is needed again. Such an approach helps to minimize the amount of training, storage, and maintenance needed for these various models.

When running a machine learning model, all inputs will typically be fed into an endpoint that processes those inputs and provides some inference output. As customer data can be sensitive or confidential, or otherwise not to be distributed to unauthorized parties, it should be ensured in such a system that the same model runtime does not leak details across customers. Accordingly, a model instance computing output for User A should not be intertwined with User B inputs. To provide sufficient isolation without having to maintain user-specific versions of all models for all users, a framework can be used where a user can have a record for a model that points to, for example, a shared base Docker image and one or more shared artifacts. The user can also have a record that points to a role that has permission to access user-specific data. When an inference job is to be run for a user, a container can be spun up from the base image to be used for processing data for a single user. Due at least in part to the nature of images, such as Docker images, such an approach can be scalable, with no additional memory overhead per user. Further, such an approach can guarantee that even a breach of a specific run would not leak details across users or isolated environments. This can be independent of the type of job to be run, where inferencing jobs may be used to identify human-understandable terminology from a catalog, determine data categorizations, or generate specific terminology, among other such options.

For at least certain large deep learning models, user-specific data might be used to fine tune a model as discussed previously. A fine tuning process can use this customer-specific data with a model to create a user-specific model artifact. Because such a model will then have been at least partially trained or fine-tuned using user-specific data, the model must be fully isolated and secure to prevent the training data from being obtained through a type of reverse-engineering process of the model or model weights. However these customer variants will only differ in the weights used for the model and not in the architecture of the model itself. As discussed, storing multiple versions of serialized models per customer is not scalable and requires a large memory footprint, such that it may be beneficial to instead create effectively-isolated models by using the same base image that contain all code necessary to run inference, and pass in user-specific artifacts when invoking compute jobs for that user. The model weights for a user can be encrypted with the appropriate user keys (e.g., public keys, encryption keys, or asymmetric keys) and/or credentials (e.g., grants, passwords, or tokens). The shared base code can have minimal business logic added to it that leaks no implementation details, but allows different users to run from same base image. Such an approach is scalable with no additional memory overhead, and can help to guarantee that customer models are secure while making it less complicated to maintain runtime code across customers.

In some embodiments, a higher level guarantee of user data isolation may be required. In such embodiments, it can be important to provide mechanisms to ensure that a single service compute environment can only access the data of a single user at any time. Due at least in part to the nature of a service being trusted as a single point, a role could be created for each user that enables them to access their key, but such an approach may not be sufficiently scalable. It can also be desirable in at least some embodiments to prevent an attacker, who gains access to a service principal, from accessing customer data through the encryption key. In at least one embodiment, this can be prevented by using a system or service such as an orchestrator to grant the service access temporarily, and in the presence of an ephemeral token that is not shared or persisted outside of the execution runtime. This secret token itself can be encrypted, and can exist in memory only during the run where the token is needed. As a result, the token is not knowable from outside of the execution, and concurrent executions have access to their respective user-specific data (and only that user-specific data) without the need for extra principals, policies, and/or resources. Once execution has completed, the token can be forgotten and that grant may no longer be usable and can be retired, with the service then no longer able to decrypt that user-specific data.

Figure 2:
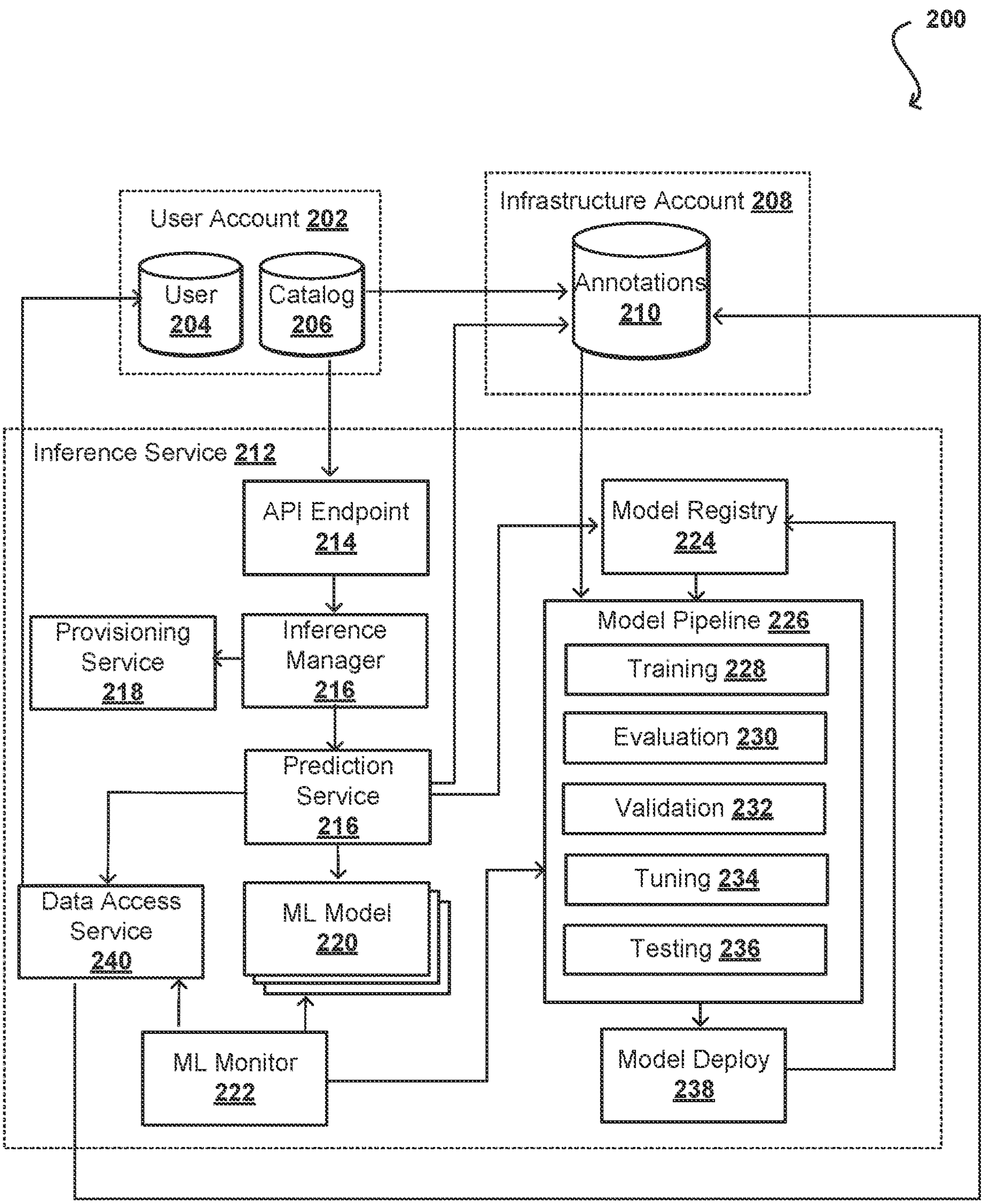
FIG. 2 illustrates an example system that can provision and fine-tune a user-specific model from a base model in accordance with various embodiments.

FIG. 2 illustrates a view 200 including additional components of an inference service 212 that can be utilized in accordance with various embodiments. This example inference service 212 provide at least some of the same functionality as inference manager 114 in FIG. 1. In this example, a user account 202 or allocation may include a user database 204 and a user catalog 206 that store user-specific data. It might be the case that a component (e.g., a system, service, or process) associated with the user account 202 wants to have an inferencing job executed with respect to data in, for example, the user catalog 206. In this case, a request can be submitted to an endpoint, such as an API endpoint 214, associated with the inference service. The request can be received to an inference manager 216, which can determine whether the appropriate model is already running in an isolated environment for that user, or whether a new model, or container or package including a model, needs to be provisioned for the inferencing job. In some embodiments, a model may be provisioned for each such job. If a model needs to be provisioned, the inference manager can contact a provisioning service 218 to identify the appropriate resources for the task and allocate those resources in an isolated user environment. The provisioning service 218 can deploy a number of user-specific resources that can each be located in respective isolated cell accounts for each of a set of users. As part of the provisioning, permissions can be configured or specified that only allow users with specific roles or credentials (e.g., one or more encryption keys) to be able to access data and/or resources for a given user in a user environment. The provisioning service may also talk with a model registry 224 to attempt to determine the current, or most recent, model that can be used to perform the inferencing job. The model registry 224 can respond with an identifier for the most recent model, or version of a model, along with additional information such as the appropriate shared runtime code or environment. In at least some embodiments, the provisioning service 218 can also be responsible for deleting or removing these components after an inferencing job has completed. The provisioning service 218 may include a provisioning state machine that maintains the state or status of the job, and triggers removal once the job is determined to be in a completed state.

As mentioned, in at least one embodiment the runtime code for a given model to be used for a type of inferencing task, as well as the base weights, initialization, and base artifact, will be the same across any users for which that model is to be provisioned. These can all be provided from a set of base components as illustrated in FIG. 1. In at least some embodiments, one or more computing resources, such as compute instances or virtual machines, can also be provisioned in the user environment to execute the runtime and allow for the inferencing job to be performed using the relevant allocated model. In some embodiments, a cluster of physical or virtual machines may be allocated, depending at least in part upon the anticipated size of the inferencing job. Certain customized resources may also have to be allocated for specific types of jobs.

Once the model is up and running in an isolated user environment, a prediction service 216 can use the relevant provisioned machine learning model 220 to perform the inferencing task using data from the user catalog 206. In this example, a data access service 240 can be tasked with sampling or otherwise reading the appropriate data from the user catalog 206. The data that is available may depend at least in part upon the role associated with the requestor for the inferencing job. The prediction service 216 can receive the predictions or inferences from the ML model 220, and the results can be provided back to the user, such as by writing them to the user database 204 or user catalog 206. If a separate user comes in to run an inferencing job, a similar process will occur, except that the model and associated runtime components will be provisioned to an environment that is specific to that user, and isolated from the first user (unless the first user also has permission in some embodiments). Such an approach enables the same based models, artifacts, code, and other such components to be reused for various users, without compromising the data that is to be isolated between those users. This can all be performed without any knowledge of the users in at least some embodiments, as the users can simply send a request to the appropriate API or endpoint, and tasks such as provisioning, isolation, and inferencing can all occur behind the scenes, with the user simply getting back results of the requested inferencing task. In some embodiments, the user does not need to specify anything other than the type of inferencing to be performed and indication of the data to be used for the inferencing (assuming that role and/or credential information are already known, provided, or available for the inferencing).

In some embodiments, the results presented back to the user may not be completely accurate. At least some systems may allow a user, or other authorized entity, to make changes or "annotations" to these results. In at least some embodiments, these annotations can be written to an annotation database 210, such as may be part of an infrastructure account if that data is permitted to be shared. In some embodiments, where the annotations may be relatively minor, these may be loaded for a user allocation of a model and used to fine-tune the model at runtime. In some embodiments, after a sufficient number of annotations have been received or after a certain amount of time has passed, for example, these annotations can be used as part of an offline training process, where a model pipeline 226 can use these annotations as a type of additional training data, where the model can use this data for training 228 and evaluation 230 procedures, followed by validation 232 and tuning 234 to determine loss values and adjust network weights to attempt to reduce or minimize the loss. The pipeline can also include a testing process 236, and after successful testing a model deployment process 238 can cause a new model, or new version of the model, to be recorded to the model registry 224 and made available as a new or updated based model for the relevant inferencing task.

In some instances, there may be a significant number of annotations for a user, or an amount of user-specific data, that can be used to further train a model to generate more accurate inferences for that particular user, without sharing that data with another user. In these cases, the model pipeline 226 can perform further training or fine-tuning of the model using at least some of this data, and can generate a user-specific artifact that can be stored for the user in the isolated user environment or user account 202. This may include, for example, network weights that are specific to this user, and when applied to the base model can result in a user-specific model. The base model, code, and other components can remain the same, but during provisioning of the model the provisioning service can see a pointer to the user-specific artifact (e.g., weights file) and can cause that artifact to be applied, along with the base code and other base components. Such an approach can allow a user to obtain a user-specific model trained using user-specific data, but without exposing the model outside the isolated environment or having to store a completely redundant set of components. In some embodiments, there may be record stored for a given model that indicate which users are associated with user-specific models. If there is not a record for a user, that user can receive the base model. If there is a record, that record can include a pointer to the relevant user-specific artifact that is to be applied to the base model for that user. Such an approach can be scalable, without breaking isolation or requiring storing of models or artifacts for all the various users. In some embodiments, whether a user-specific model can be generated and maintained for a user may also depend at least in part upon the role of that user.

In some embodiments, there may also be user-specific code that is to be used to run a particular type of inferencing job for a user. Any user specific code, weights, or other components or information can be bundled into a user-specific artifact. Then, at inference time, a new ephemeral container can be spun up for a specific user, and the relevant pointer can be used to identify the artifact to be applied to (or, in some instances, at least partially replace) the base components in the container. Such an approach still respect isolation while reducing the number of artifacts or code packages that need to be stored or executed using a model. The role used to spin up the container can provide access to the relevant user-specific data and artifact(s). Once inferencing has completed, the container including the model and all allocated resources can be deallocated. The same basic process can be used by different users with different user-specific data that is to be isolated, except that the pointer used in the process may point to different user-specific artifacts and data in at least some instances. Such an approach can provide for high scalability. Further, if one user environment is compromised, this should not also compromise any of the other user environments.

Figure 3:
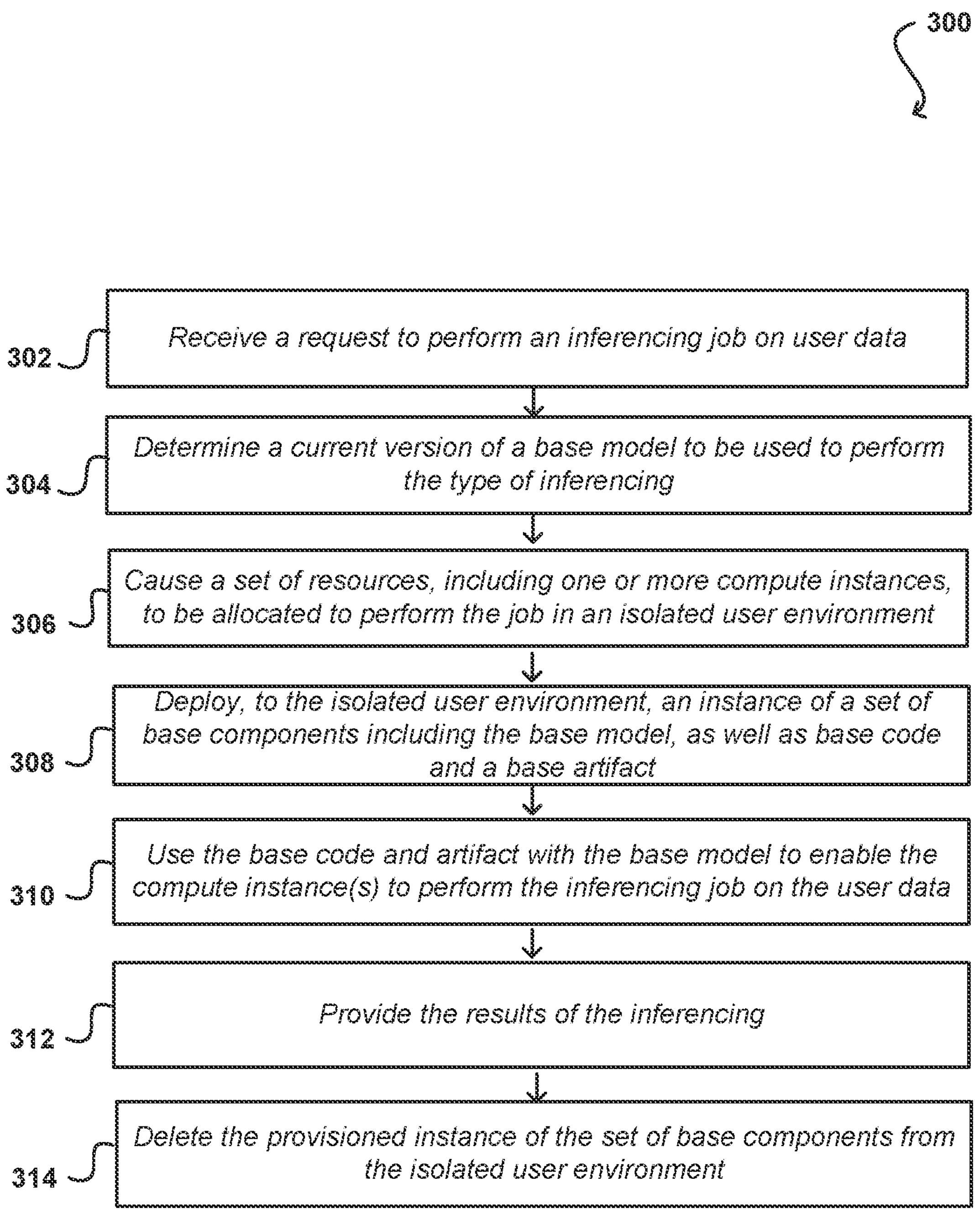
FIG. 3 illustrates an example process for allocating base resources for execution in a user-specific environment that can be performed in accordance with various embodiments.

FIG. 3 illustrates an example process 300 for using shared base components to perform inferencing tasks in isolated, single-tenant user environments that can be performed in accordance with various embodiments. It should be understood that for this and other processes presented herein there may be additional, fewer, or alternative steps performed in similar or alternative orders, or at least partially in parallel, within the scope of the various embodiments unless otherwise specifically stated. Further, although described with respect to inferencing tasks, it should be understood that advantages such as shared resources and data isolation can be obtained for other types of tasks or operations as well within the scope of the various embodiments. In this example, a request is received 302 to perform an inferencing job on user data. This job can be performed using resources of a multi-tenant resource environment, but the user data may be restricted to access within an isolated single-user environment. A current (or most recent) version of a model can be determined 304 that is to be used to perform the type of inferencing required for the job. This might include, for example, a model of a particular type with a particular architecture, which is the most recently trained or fine-tuned version. A set of resources, from the multi-tenant resource environment, can be caused 306 to be allocated to perform the job in the isolated user environment, where the resources can include one or more compute instances or virtual machines, among other such resources. An instance of a set of shared base components can be provisioned and/or deployed 308 to the isolated user environment, where those base components may include the base model, along with any associated based execution code or artifacts, such as a set of network weights to be applied to the base model. The base code and artifact(s) can be used 310 with the based model to enable the compute instance(s) in the isolated user environment to perform the inferencing job on the relevant user data. The results of the inferencing can then be provided 312 back to the user, a user device, or another target recipient. After inferencing has been completed, the provisioned instance of the set of base components can be detected 314 from the isolated user environment, such that no resources are used to unnecessarily store a copy of the based components in the isolated user environment. The instances of these components can be loaded again as necessary for any subsequent inferencing jobs.

Figure 4:
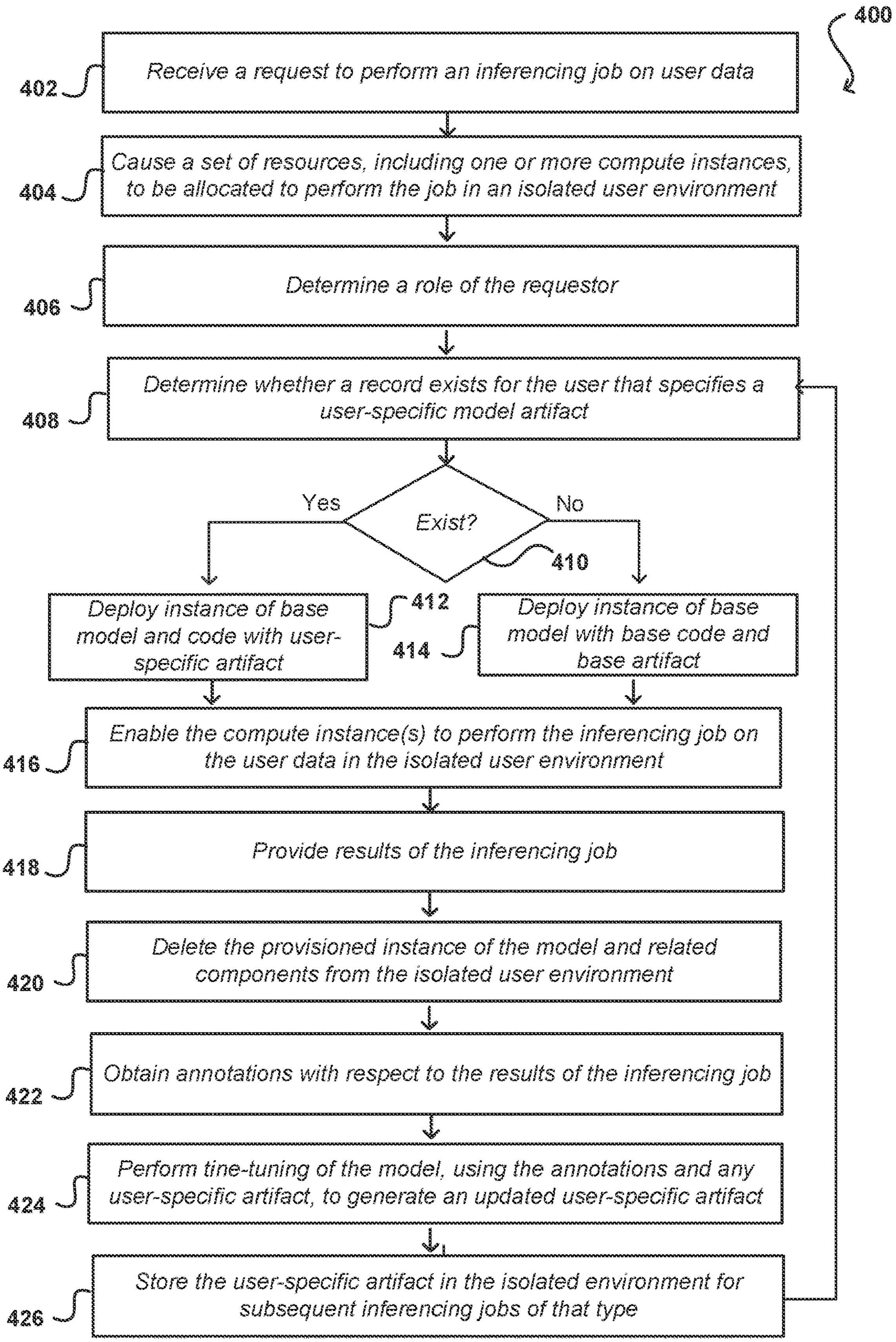
FIG. 4 illustrates an example process for allocating a combination of base and user-specific resources for execution in a user-specific environment that can be performed in accordance with various embodiments.

It might be the case, however, that at least some of the users will want to have inferencing performed using a model that is at least partially trained or fine-tuned on data that is specific to that user, in order to generate more accurate inferences on that user data. In many instances, however, the user data is to be kept secure and not accessible by other users, systems, or services outside the isolated user environment. FIG. 4 illustrates an example process 400 for allowing deployment of user-specific models to perform tasks, such as inferencing using user-specific data in an isolated user environment. In this example, a request is received 402 to perform an inferencing job on user data. A set of resources, such as compute instances of a multi-tenant resource environment, can be caused 404 to be allocated to perform the job in an isolated user environment. A role of, or associated with, the requestor can be determined 406, and it can also be determined 408 whether a record (or other indicator) exists for the user that specifies a user-specific model artifact to be used for the inferencing job. If it is determined 410 that such a record exists for this user, an instance of a shared base model and base execution code can be deployed 412 to the isolated user environment along with the corresponding user-specific artifact to which that record points, which can enable those user-specific network weights to be applied to the base model, effectively resulting in a user-specific model. As discussed, there may be other aspects impacted by the artifact as well, as may represent changes to the code or model. If no such record or indicator exists then an instance of the shared base model, base code, and base artifact can be provisioned or deployed 414 for the inferencing task in the isolated user environment, such as is described with respect to FIG. 3. As mentioned, in at least some embodiments the base components can be deployed using a container or other such mechanism, that may also contain the appropriate data and configuration for performing the inferencing task.

Once the resources are deployed and configured, the compute instance(s) are enabled 416 to perform the inferencing task on the user data in the isolated user environment. The results of the inferencing task can then be provided 418 back to the requestor or another target recipient. The provisioned ephemeral instance of the model and related components can then be deleted 420 from the isolated user environment. After the user has a chance to analyze the results, a set of annotations (or other changes or corrections) may be obtained 422 with respect to the inferencing task. These annotations can be used to fine-tune the model during inferencing, or can be used in an offline process to generate a further trained model with updated network weights. The fine-tuning or further training can be performed 424 using the annotations (and any existing user-specific artifact from prior fine tuning), which can generate or produce an updates user-specific artifact with new network weights. The user-specific artifact can then be stored 426 in the isolated user environment for subsequent inferencing jobs of that type, such that when a new model is deployed then the most recent network weights for this user can be applied. In this way, a user-specific model can be obtained and utilized in an isolated user environment without having to store a full copy of the model, code, and weights, and the user-specific artifact or weights are also not available outside the isolated user environment.

In some embodiments, models may run on the low level user data itself, such that it may be desirable for a resource (or model) provider to sample some of that low-level user data and store in in an infrastructure account 208, as discussed with respect to FIG. 2. Access to such data may be desired for many tasks, such as sampling user data for inference, storing user-provided annotated data for model training and fine-tuning, storing user ground truth from previous predictions, or storing user signals or ground truth performed directly on a user catalog. When doing so, however, the user data still has to be isolated such that it is not accessible by other users, even if they obtain access to the infrastructure account.

Figure 5:
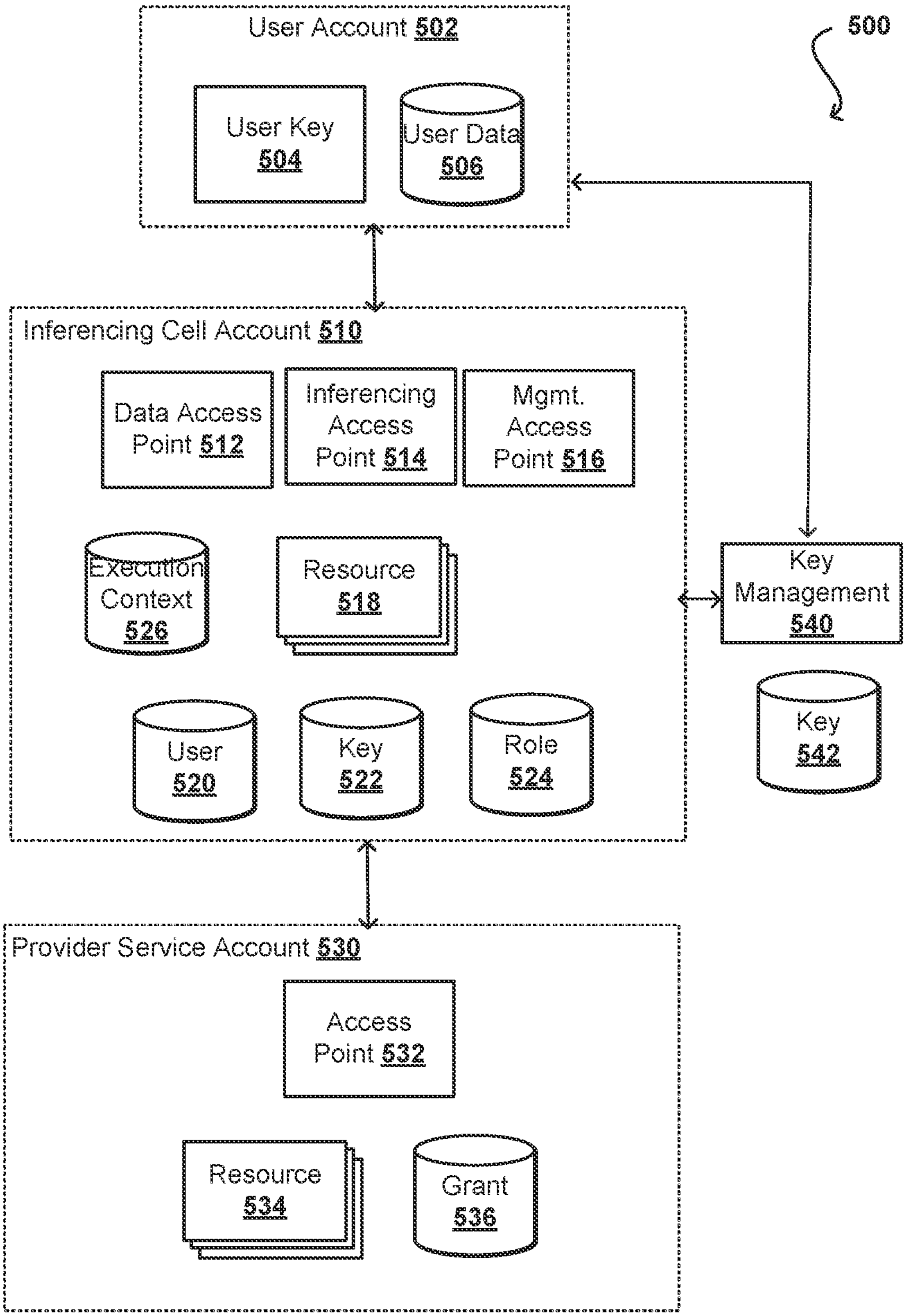
FIG. 5 illustrates an example system for managing secure access to user data, in accordance with various embodiments.

FIG. 5 illustrates an example system 500 that can be used to provide for isolation of stored user data in accordance with at least one embodiment. In this example, a key management service 540 can store and manage public encryption keys for various users, where those keys may be stored to a secure data repository 542. Any service, or microservice, that wants to obtain access to user data 504, 506 of a user account 502 for training (or another such service) would need to have access, or be trusted, to use the respective key(s). A service provider might have access to keys for all user data, but might only have access to certain user data for specific purposes. Thus, an entity may have a role that dictates the keys to which they have permission or access, as well as the limitations on that permission or access. In at least some embodiments, a key management service can also generate and maintain an execution context for at least certain keys. A key management service can execute a granting process to create a grant on a given key for access by a user, principle, account, or provider, among other such options. That grant can be stored to, for example, a grant database 536 in a service provider account 530, which can enable resources 534 in that account to access that user data. The service 540 can also generate an ephemeral or random execution context 526 that can be maintained only within a given execution environment, such as within a inferencing cell account 510 for performing inferencing using one or more allocated resources 518. In this way, it is not enough for an entity to have access to a role to be able to interact with the user data, but the entity would also have to have access to the relevant encryption key, which is maintained only within that particular execution context. After the execution context has completed, the grant is no longer usable and is retired. Even if not yet retired, however, the associated token would have expired and would not have been kept anywhere else. In this example, the inferencing cell account 510 has multiple access points to be used for different purposes, such as a data access point 512 for accessing user data, an inferencing access point 514 for requesting inferencing, and a management access point 516 that can be used by, for example, the provider service account 530 to perform management tasks. The inferencing cell account can include information that allows training and/or inferencing to be performed using sampled user data, where that data may include role information 524 enabling access, data for the relevant keys 522 and users 520, as well as execution context 526 indicating permissions for the user data under the relevant keys.

In at least one embodiment, such a system 500 can be used to create grants for executing jobs such as inferencing jobs. This may include obtaining access, from a user, to a key associated with that user. The access can be used to create grants that can apply to a principle, for example, or can designate a principle to retire the grant, and can contain an encryption context to limit access to user data. As mentioned, a role can be created with specific grant permissions for a specific user key, where that role is assumable by the inferencing service. As discussed elsewhere herein, at least some of these roles can be used across multiple users to provide access to data in user-specific contexts corresponding to the respective user credentials. During an inferencing job, a prediction or inferencing service can kick off a state machine. The state machine can create the necessary grants on the user key, but also generate an identifier (e.g., a UUID) to act as the encryption context. In this way, any actions on a user bucket can require the appropriate encryption context, or UUID, to gain access. A UUID can be passed in a state machine or stored in a secret manager, among other such options. If a third party gains access to the role granted to use the user key, that third party can only use the role if the party also knows the UUIS to add to the encryption context. Upon completion of an inferencing job, or cleaning up due to a failure, the grants can be retired by the prediction service so they will no longer be active. Thus, access to use the user key can be ephemeral, created and retired in the inferencing job, and can also be tightly scoped, such as by requiring a randomly-generated UUIS created during the job.

Figure 6:
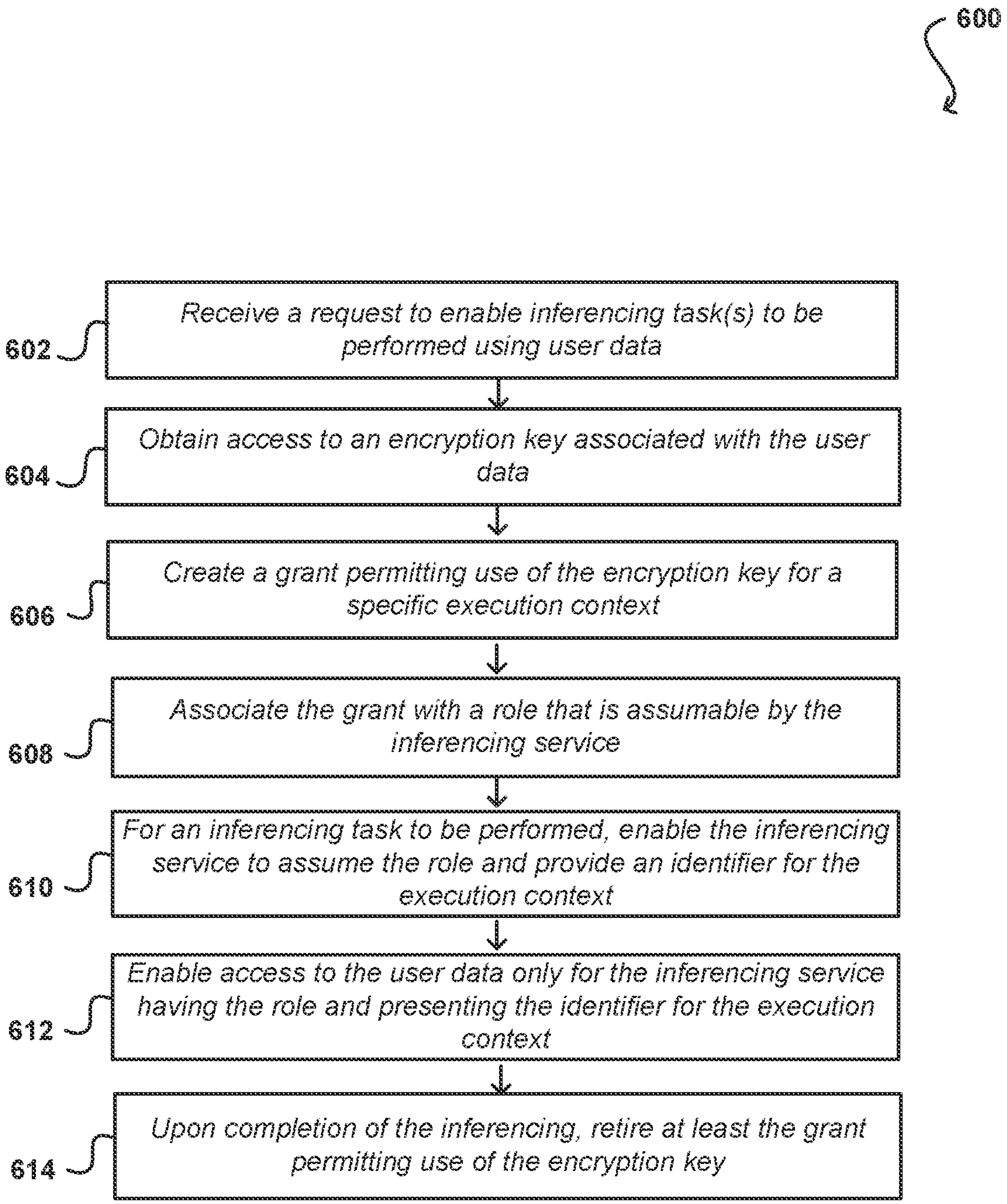
FIG. 6 illustrates an example process for managing access to user data for an inferencing task that can be performed in accordance with various embodiments.

FIG. 6 illustrates one such example process 600 for enforcing security controls on user data that can be performed in accordance with various embodiments. In this example, a request is received 602 to enable one or more inferencing tasks to be performed using user data, where access to that user data is restricted. In this example, the user data can be encrypted using a user key and only accessible to someone (or something) having access to that user key. As part of this process, access to a relevant encryption key associated with this user data can be obtained 604, such as by using information associated with the request. A grant can be created 606 that permits use of that key for a specific execution context, as may relate to a type of environment, type of task, or type of access, among other such options. The execution context in one embodiment is randomly generated, and functions like a one-time passcode which can be deleted after a corresponding inferencing task (or other operation) has completed. The grant can be associated 608 with a role that is assumable by the inferencing service. For an inferencing task that is to be performed in an isolated user environment with respect to the user data, the inferencing service can be enabled 610 to assume the role and provide an identifier (e.g., a UUID) for the execution context. Access to the user data for the inferencing task can then be enabled 612 or provided only for the inferencing service having the role and presenting the identifier for the execution context. Having only the role or the identifier will not be sufficient in this example. Upon completion of the inferencing, at least the grant permitting use of the encryption key can be retired, such that further access to the user data under the role can be prevented.

Figure 7:
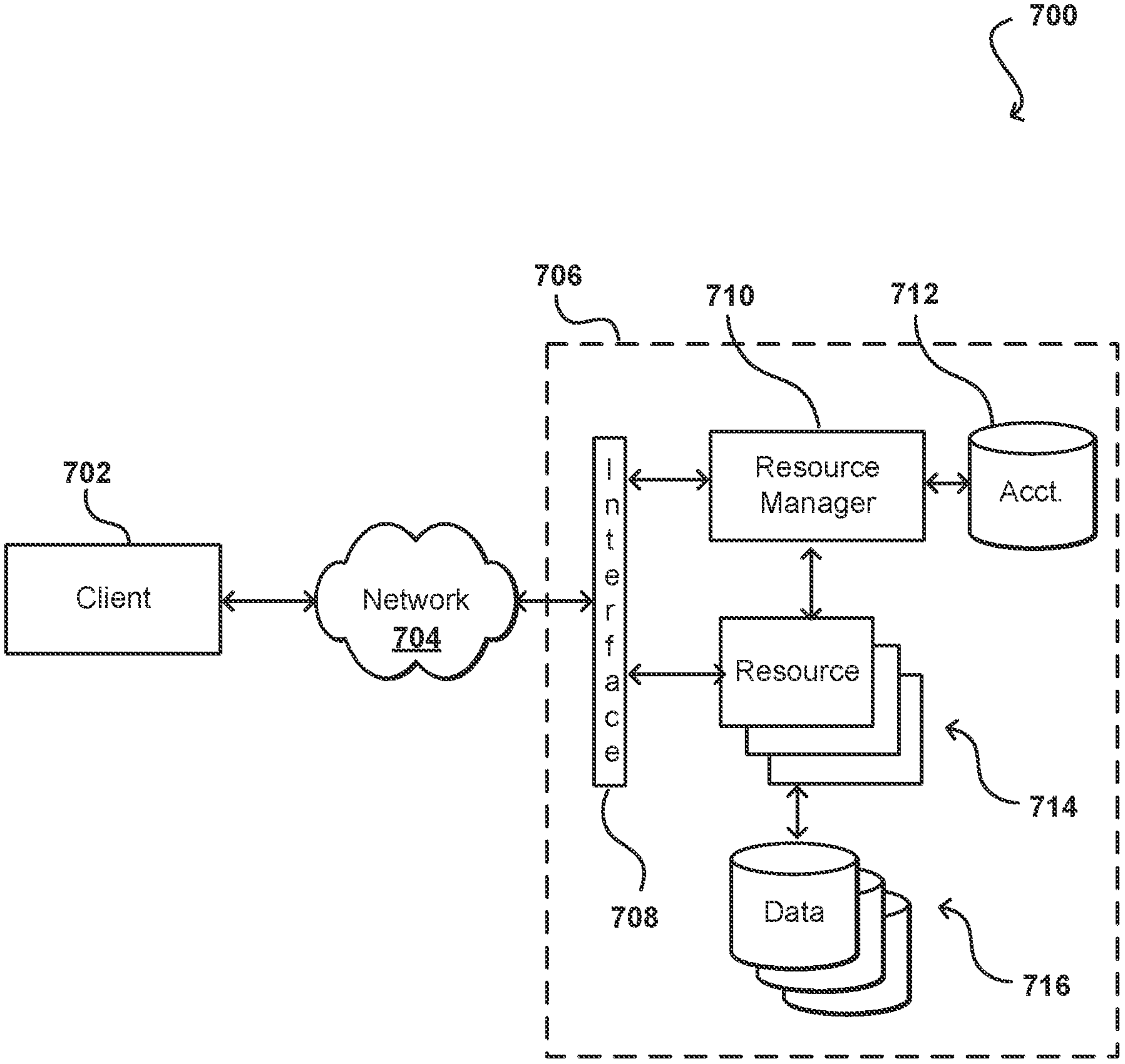
FIG. 7 illustrates an example network-inclusive computing environment in which aspects of various embodiments can be implemented.

FIG. 7 illustrates an example environment 700 in which aspect of various embodiments can be implemented. Such an environment can be used in some embodiments to provide resource capacity for one or more users, or customers of a resource provider, as part of a shared or multi-tenant resource environment. In this example a user is able to utilize a client device 702 to submit requests across at least one network 704 to a multi-tenant resource provider environment 706. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 706 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 702 to communicate with an allocated resource without having to communicate with the resource manager 710, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
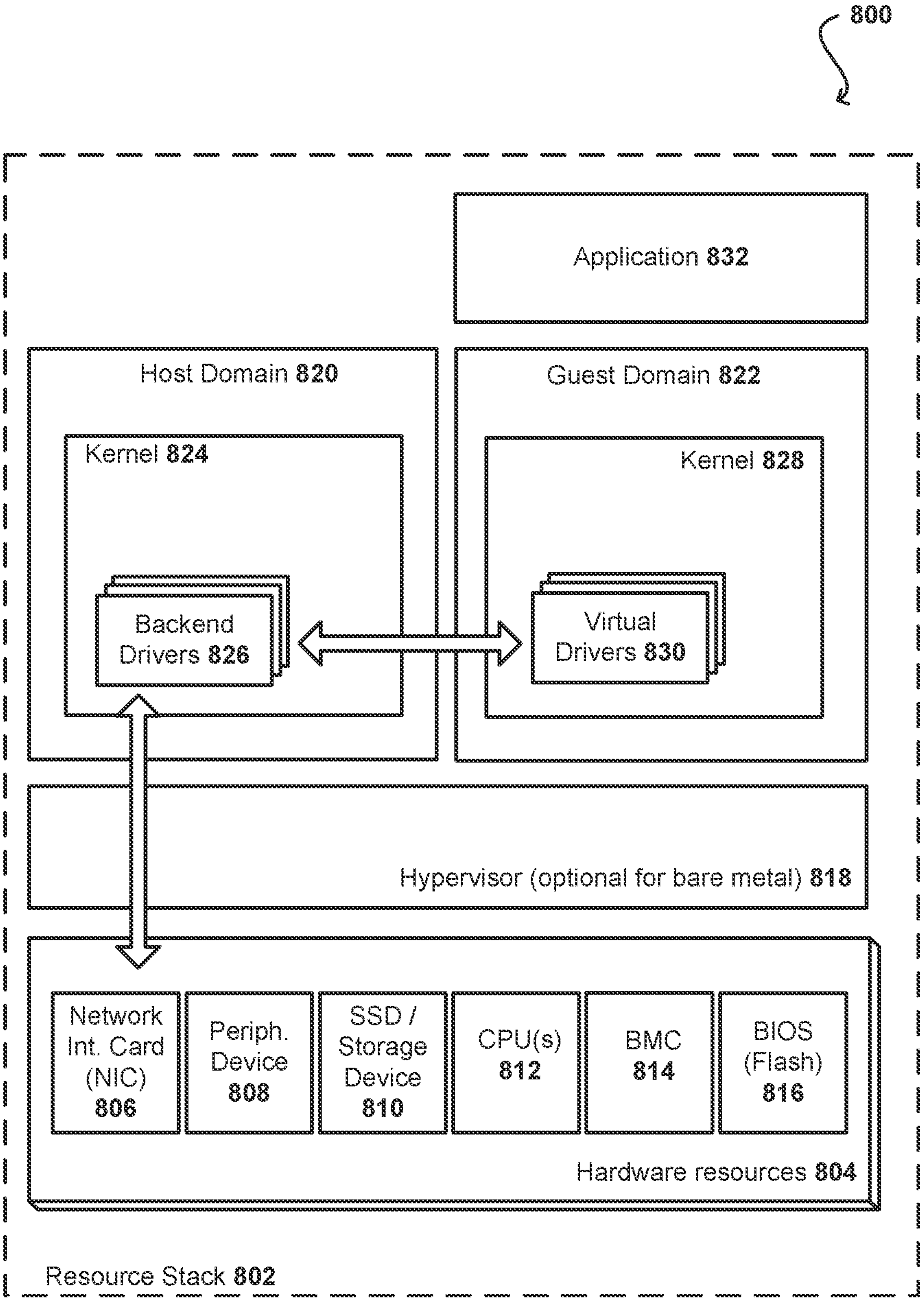
FIG. 8 illustrates example components of a server that can be utilized to perform at least a portion of a transcoding process, in accordance with various embodiments.

FIG. 8 illustrates an example resource stack 802 of a physical resource 800 that can be utilized in accordance with various embodiments. Such a resource stack 802 can be used to provide an allocated environment for a user (or customer of a resource provider) having an operating system provisioned on the resource. In accordance with the illustrated embodiment, the resource stack 802 includes a number of hardware resources 804, such as one or more central processing units (CPUs) 812; solid state drives (SSDs) or other storage devices 810; a network interface card (NIC) 806, one or more peripheral devices (e.g., a graphics processing unit (GPU), etc.) 808, a BIOS implemented in flash memory 816, and a baseboard management controller (BMC) 814, and the like. In some embodiments, the hardware resources 804 reside on a single computing device (e.g. chassis). In other embodiments, the hardware resources can reside on multiple devices, racks, chassis, and the like. Running on top of the hardware resources 804, a virtual resource stack may include a virtualization layer such as a hypervisor 818 for a Xen-based implementation, a host domain 820, and potentially also one or more guest domains 822 capable of executing at least one application 832. The hypervisor 818, if utilized for a virtualized environment, can manage execution of the one or more guest operating systems and allow multiple instances of different operating systems to share the underlying hardware resources 804. Conventionally, hypervisors are installed on server hardware, with the function of running guest operating systems, where the guest operating systems themselves act as servers.

In accordance with an embodiment, a hypervisor 818 can host a number of domains (e.g., virtual machines), such as the host domain 820 and one or more guest domains 822. In one embodiment, the host domain 820 (e.g., the Dom-0) is the first domain created and helps virtualize hardware resources and manage all of the other domains running on the hypervisor 818. For example, the host domain 820 can manage the creating, destroying, migrating, saving, or restoring the one or more guest domains 822 (e.g., the Dom-U). In accordance with various embodiments, the hypervisor 818 can control access to the hardware resources such as the CPU, input/output (I/O) memory, and hypervisor memory.

A guest domain 822 can include one or more virtualized or para-virtualized drivers 830 and the host domain can include one or more backend device drivers 826. When the operating system (OS) kernel 828 in the guest domain 822 wants to invoke an I/O operation, the virtualized driver 830 may perform the operation by way of communicating with the backend device driver 826 in the host domain 820. When the guest driver 830 wants to initiate an I/O operation (e.g., to send out a network packet), a guest kernel component can identify which physical memory buffer contains the packet (or other data) and the guest driver 830 can either copy the memory buffer to a temporary storage location in the kernel for performing I/O or obtain a set of pointers to the memory pages that contain the packet(s). In at least one embodiment, these locations or pointers are provided to the backend driver 826 of the host kernel 824 which can obtain access to the data and communicate it directly to the hardware device, such as the NIC 806 for sending the packet over the network.

It should be noted that the resource stack 802 illustrated in FIG. 8 is only one possible example of a set of resources that is capable of providing a virtualized computing environment and that the various embodiments described herein are not necessarily limited to this particular resource stack. In some embodiments, the guest domain 822 may have substantially native or "bare metal" access to the NIC 806 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 814 can maintain a list of events that have occurred in the system, referred to herein as a system event log (SEL). In at least one embodiment, the BMC 814 can receive system event logs from the BIOS 816 on the host processor. The BIOS 816 can provide data for system events over an appropriate interface, such as an $I^2C$ interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 818 can prevent the guest operating system, or guest domain 822, from sending such system event log data to the BMC 814. In the case of bare metal access without such a hypervisor, however, user instances can have the ability to send data for system event that spoof events from the BIOS 816. Such activity could lead to compromised bare metal instances being prematurely degraded due to fake system event data produced by the user OS.

In at least one embodiment, however, there will be portions of the physical resource 800 that will be inaccessible to the user OS. This can include, for example, at least a portion of BIOS memory 816. BIOS memory 816 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 816 at boot time, before a user OS is executing on the resource. Once the user OS is executing on the resource, that OS will be prevented from accessing that secret token in BIOS memory 816. In at least one embodiment, this secret token (or other stored secret) can be provided to the BMC 814 when adding system event log events, whereby the BMC 814 can confirm that the event is being sent by the BIOS 816 and not by the user OS.

Figure 9:
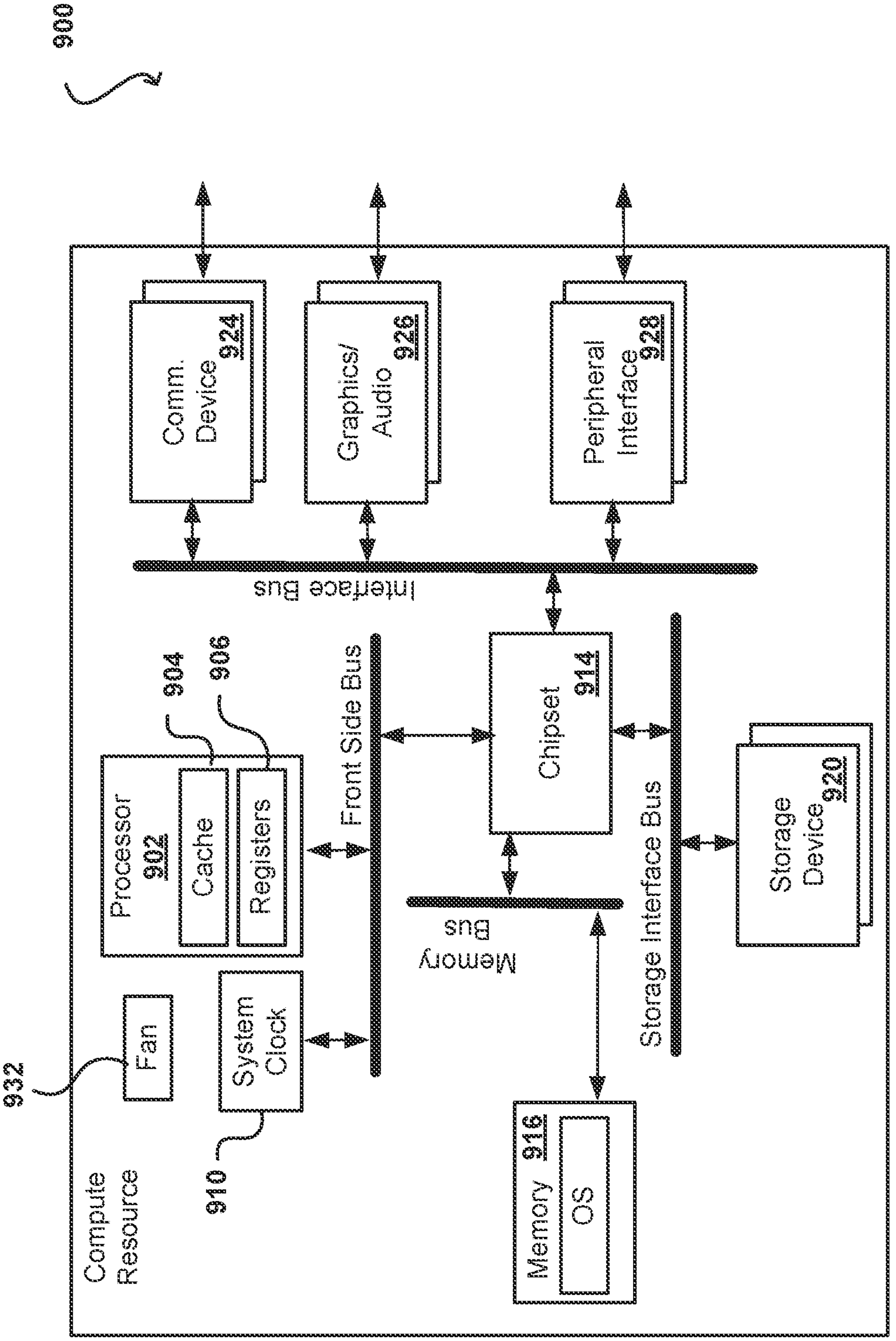
FIG. 9 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 9 illustrates components of an example computing resource 900 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 900 (e.g., a desktop or network server) will have one or more processors 902, such as central processing units (CPUs), graphics processing units (GPUs), and the like, that are electronically and/or communicatively coupled with various components using various buses, traces, and other such mechanisms. A processor 902 can include memory registers 906 and cache memory 904 for holding instructions, data, and the like. In this example, a chipset 914, which can include a northbridge and southbridge in some embodiments, can work with the various system buses to connect the processor 902 to components such as system memory 916, in the form or physical RAM or ROM, which can include the code for the operating system as well as various other instructions and data utilized for operation of the computing device. The computing device can also contain, or communicate with, one or more storage devices 920, such as hard drives, flash drives, optical storage, and the like, for persisting data and instructions similar, or in addition to, those stored in the processor and memory. The processor 902 can also communicate with various other components via the chipset 914 and an interface bus (or graphics bus, etc.), where those components can include communications devices 924 such as cellular modems or network cards, media components 926, such as graphics cards and audio components, and peripheral interfaces 928 for connecting peripheral devices, such as printers, keyboards, and the like. At least one cooling fan 932 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 902 can obtain data from physical memory 916, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 904 in at least some embodiments. The computing device 900 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 928, a communication device 924, a graphics or audio card 926, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 902 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one of more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

receiving, to a multi-tenant resource environment, a request to perform an inferencing task on behalf of a user and using user-specific data;

allocating, for an isolated user environment, one or more resources of the multi-tenant environment to perform the inferencing task;

deploying, to the one or more resources in the isolated user environment, a software container including a base image associated with a base machine learning model and base code for executing the inferencing task using the base machine learning model, the base image and the base code obtained from a model registry securely maintaining version control for the base image;

loading at least one artifact for use with the base machine learning model, the at least one artifact including a base artifact including a set of base model machine learning weights or a user-specific artifact including a set of user-specific machine learning model weights determined by fine-tuning the base machine learning model using at least a portion of the user-specific data;

causing the one or more resources in the isolated user environment to perform the inferencing task using the user-specific data and the base machine learning model having the set of base machine learning model weights or set of user-specific machine learning model weights applied;

providing one or more results of the inferencing task;

deleting the base machine learning model, base code, and the set of base machine learning model weights or set of user-specific machine learning model weights from the isolated user environment.

2. The computer-implemented method of claim 1, further comprising:

assigning a role to the user that is associated with the user-specific data; and determining, by the request being associated with the role, that only the user-specific data is to be used for the inferencing task.

3. The computer-implemented method of claim 2, wherein the user-specific data is encrypted using a user key, and wherein the role is associated with a grant to access the key within a specified execution context corresponding to the inferencing task.

4. The computer-implemented method of claim 1, further comprising:

receiving one or more annotations with respect to the one or more results;

performing fine-tuning of the base machine learning model using the one or more annotations; and securely storing results of the fine-tuning as the set of user-specific machine learning model weights.

5. The computer-implemented method of claim 1, further comprising:

performing further training of the base machine learning model to generate a new version of the base machine learning model; and storing the new version to the model registry, wherein subsequent requests received to perform inferencing tasks on behalf of one or more users are able to utilize a container including the new version of the base machine learning model.

6. A computer-implemented method, comprising:

receiving a request to perform, on behalf of a user, an inferencing task on user data in an isolated user environment;

deploying, onto one or more resources allocated to the user environment to perform the inferencing task, an instance of a base machine learning model and base machine learning model execution code from a model registry securely maintaining version control for the base machine learning model;

applying, to the base machine learning model, a set of base machine learning model weights or a set of user-specific machine learning model weights;

causing the inferencing task to be performed using the base machine learning model, having the set of base machine learning model weights or the set of user-specific machine learning model weights applied, in the isolated user environment and using only the user data; and deleting, after performance of the inferencing task is completed, the instance of the base machine learning model, the base machine learning model execution code, and the set of base machine learning model weights or the set of user-specific machine learning model weights from the isolated user environment.

7. The computer-implemented method of claim 6, wherein the isolated user environment is a logically isolated environment within a multi-tenant environment, and wherein the one or more resources are allocated from the multi-tenant environment.

8. The computer-implemented method of claim 6, wherein the base machine learning model is contained in the model registry that includes current versions of each of a plurality of machine learning models that are able to be used to perform a plurality of inferencing tasks on behalf of a plurality of users of a multi-tenant environment.

9. The computer-implemented method of claim 8, wherein only one copy of each of the current versions is stored in the model registry in a multi-tenant environment except when a copy of the base machine learning model is to be used for inferencing in one or more user environments.

10. The computer-implemented method of claim 6, wherein the base machine learning model and the base machine learning model execution code are to be deployed to the one or more resources using a software container.

11. The computer-implemented method of claim 6, further comprising:

assigning a role to the user that is associated with the user data; and determining, by the request being associated with the role, that only the user data is to be used for the inferencing task.

12. The computer-implemented method of claim 11, wherein the user data is encrypted using a user key, and wherein the role is associated with a grant to access the key within a specified execution context corresponding to the inferencing task.

13. The computer-implemented method of claim 6, further comprising:

receiving one or more annotations with respect to one or more results of the inferencing task;

performing fine-tuning of the base machine learning model using the one or more annotations; and securely storing results of the fine-tuning as the set of user-specific machine learning model weights.

14. The computer-implemented method of claim 6, further comprising:

performing further training of the base machine learning model to generate a current version of the base machine learning model; and storing the current version to the model registry, wherein subsequent requests received to perform inferencing tasks on behalf of one or more users are able to utilize a container including the current version of the base machine learning model.

15. The computer-implemented method of claim 6, wherein the one or more resources include at least one of a physical machine, virtual machine, or machine instance allocated from a plurality of resources in a multi-tenant environment sharable among a plurality of users.

16. A system, comprising:

a processor; and memory including instructions that, when executed by the processor, cause the system to:

receive a request to perform, on behalf of a user, an inferencing task on user data in a user environment;

deploy, onto one or more resources allocated to the user environment to perform the inferencing task, an instance of a base machine learning model and base machine learning model execution code from a model registry securely maintaining version control for the base machine learning model;

apply, to the base machine learning model, a set of base machine learning model weights or a set of user-specific machine learning model weights;

cause the inferencing task to be performed using the base machine learning model, having the set of base machine learning model weights or the set of user-specific machine learning model weights applied, in the isolated user environment and using only the user data; and delete, after performance of the inferencing task is completed, the instance of the base machine learning model, the base machine learning model execution code, and the set of base machine learning model weights or the set of user-specific machine learning model weights from the isolated user environment.

17. The system of claim 16, wherein the user environment is a logically isolated environment within a multi-tenant environment, and wherein the one or more resources are allocated from the multi-tenant environment.

18. The system of claim 16, wherein the base machine learning model is contained in the model registry that includes current versions of each of a plurality of machine learning models that are able to be used to perform a plurality of inferencing tasks on behalf of a plurality of users of a multi-tenant environment, and wherein only one copy of each of the current versions is stored in the model registry in a multi-tenant environment except when a copy of the base machine learning model is being used for inferencing in one or more user environments.

19. The system of claim 16, wherein the instructions when executed further cause the system to:

assign a role to the user that is associated with the user data; and determine, by the request being associated with the role, that only the user data is to be used for the inferencing task.

20. The system of claim 16, wherein the instructions when executed further cause the system to:

receive one or more annotations with respect to one or more results of the inferencing task;

perform fine-tuning of the base machine learning model using the one or more annotations; and securely store results of the fine-tuning as the set of user-specific machine learning model weights.

* * * * *